US012763418B2

(12) United States Patent
Tang et al.

(10) Patent No.: US 12,763,418 B2
(45) Date of Patent: Oct. 13, 2026

(54) BATTERY AND POWER CONSUMING DEVICE

(71) Applicant: CONTEMPORARY AMPEREX TECHNOLOGY (HONG KONG) LIMITED, Hong Kong (CN)

(72) Inventors: Yu Tang, Ningde City (CN); Peng Wang, Ningde City (CN); Xiayi Wu, Ningde City (CN); Zhenhua Li, Ningde City (CN); Xiang Wang, Ningde City (CN); Xing Li, Ningde City (CN)

(73) Assignee: CONTEMPORARY EMPEREX TECHNOLOGY (HONG KONG) LIMITED, Hong Kong (CN)

( * ) Notice: Subject to any disclaimer, the term of this patent is extended or adjusted under 35 U.S.C. 154(b) by 656 days.

(21) Appl. No.: 18/296,364

(22) Filed: Apr. 5, 2023

(65) Prior Publication Data

US 2023/0261306 A1 Aug. 17, 2023

Related U.S. Application Data

(63) Continuation of application No. PCT/CN2021/106381, filed on Jul. 15, 2021.

(51) Int. Cl.

| | |
|---|---|
| ***H01M 50/264*** | (2021.01) |
| ***B60K 1/04*** | (2019.01) |
| ***H01M 50/204*** | (2021.01) |
| ***H01M 50/249*** | (2021.01) |
| ***H01M 50/271*** | (2021.01) |

(52) U.S. Cl.

CPC ............ *H01M 50/264* (2021.01); *B60K 1/04* (2013.01); *H01M 50/204* (2021.01); *H01M 50/249* (2021.01); *H01M 50/271* (2021.01); *H01M 2220/20* (2013.01)

(58) Field of Classification Search

CPC ............ H01M 50/264; H01M 50/204; H01M 50/249; H01M 50/271; H01M 2220/20; H01M 50/209; H01M 2200/20; H01M 50/242; H01M 50/289; H01M 2220/30; B60K 1/04; Y02E 60/10

See application file for complete search history.

(56) References Cited

U.S. PATENT DOCUMENTS

| | | | | |
|---|---|---|---|---|
| 2008/0057392 | A1* | 3/2008 | Takamatsu | H01M 10/6563 429/154 |
| 2008/0124625 | A1* | 5/2008 | Hock | H01M 8/2475 429/176 |
| 2016/0359153 | A1* | 12/2016 | Kano | H01M 50/20 |
| 2020/0411817 | A1* | 12/2020 | You | H01M 10/0431 |
| 2021/0305651 | A1* | 9/2021 | You | H01M 50/249 |

FOREIGN PATENT DOCUMENTS

| | | | |
|---|---|---|---|
| CN | 106252544 | A | 12/2016 |
| CN | 207459019 | U | 6/2018 |
| CN | 209150260 | U | 7/2019 |
| CN | 209963117 | U | 1/2020 |
| CN | 110931672 | A | 3/2020 |
| CN | 112151709 | A | 12/2020 |
| CN | 112151917 | A | 12/2020 |
| EP | 2875547 | B1 | 5/2018 |
| EP | 3758091 | A1 | 12/2020 |
| EP | 3836244 | A1 | 6/2021 |
| JP | 2003007276 | A | 1/2003 |
| JP | 2008059941 | A | 3/2008 |
| JP | 2017004606 | A | 1/2017 |
| JP | 2017054755 | A | 3/2017 |
| JP | 2018532235 | A | 11/2018 |
| JP | 2020113405 | A | 7/2020 |
| JP | 2023511609 | A | 3/2023 |
| JP | 2023536772 | A | 8/2023 |
| KR | 20180068379 | A | 6/2018 |
| WO | 2014/013198 | A1 | 1/2014 |
| WO | 2020259135 | A1 | 12/2020 |

OTHER PUBLICATIONS

Office Action, mailed Jul. 29, 2025, for corresponding European Application Serial No. 21937190.3.
Notice of Grant, with English Machine Translation, mailed May 13, 2025, for corresponding Korean Application Serial No. 10-2022-7036054.
International Search Report received in the corresponding International Application PCT/CN2021/106381, mailed Mar. 15, 2022.
Written Opinion received in the corresponding International Application PCT/CN2021/106381, mailed Mar. 15, 2022.
Notice of Reasons for Refusal received in the corresponding Japanese Application 2022-563082, mailed Nov. 14, 2023.
The extended European search report received in the corresponding European Application 21937190.3, mailed May 30, 2023.
Office Action (with English Machine Translation), mailed Jun. 3, 2026, for corresponding Chinese Patent Application Serial No. 202180068846.7.

* cited by examiner

*Primary Examiner* — Muhammad S Siddiquee
(74) *Attorney, Agent, or Firm* — K&L Gates LLP

(57) ABSTRACT

A battery and a power consuming device are provided. In some embodiments, the battery includes: a case assembly, including a case and fixed beams fixed in the case; a battery module arranged in the case, wherein the battery module includes a plurality of battery cells arranged in a first direction (X); and a restraining component, configured to cover the battery module and fixed to the fixed beams, wherein the restraining component is provided with a weak area, and the weak area is configured to allow the restraining component to be deformed when being subjected to an expansion force of each battery cell.

15 Claims, 5 Drawing Sheets

BATTERY AND POWER CONSUMING DEVICE

CROSS-REFERENCE TO RELATED APPLICATIONS

This application is a continuation of International Application No. PCT/CN2021/106381, filed Jul. 15, 2021, and entitled "BATTERY AND POWER CONSUMING DEVICE", which is incorporated herein by reference in its entirety.

TECHNICAL FIELD

The present application relates to the technical field of batteries, and more particularly to a battery and a power consuming device.

BACKGROUND ART

Due to the advantages such as high energy density, high power density, many cycles of use, and long storage time, batteries such as lithium ion batteries have been widely used in electric vehicles.

However, how to improve the reliability and prolong the service life of the batteries of the electric vehicles has always been a problem in the industry.

SUMMARY OF THE INVENTION

An objective of the present application is to improve the reliability and prolong the service life of a battery in operation.

According to a first aspect of the present application, provided is a battery, including:

- a case assembly, including a case and fixed beams fixed in the case;
- a battery module, arranged in the case, wherein the battery module includes a plurality of battery cells arranged in a first direction; and
- a restraining component, configured to cover the battery module and fixed to the fixed beams, wherein the restraining component is provided with a weak area, and the weak area is configured to allow the restraining component to be deformed when being subjected to an expansion force of each battery cell.

In some embodiments, the weak area is arranged at least in an adjoining region between the battery cells adjacent to each other in the first direction.

In some embodiments, the weak area includes a slot extending in a second direction perpendicular to the first direction.

In some embodiments, the weak area is continuously arranged in a second direction perpendicular to the first direction.

In some embodiments, the weak area penetrates the restraining component in a third direction, the third direction being perpendicular to a plane formed by the first direction and a second direction perpendicular to the first direction.

In some embodiments, the battery further includes:

- an outer cover, arranged on the side of the restraining component away from the case, and configured to close an opening end of the case, wherein a preset gap is provided between an inner surface of the outer cover and an outer surface of the restraining component.

In some embodiments, a bonding layer is provided between the restraining component and at least part of the battery cells, and the bonding layer overflows through the weak area and forms a limiting boss on the surface of the restraining component away from the battery cells.

In some embodiments, the fixed beams are arranged on two sides of the battery module in a second direction perpendicular to the first direction. The restraining component includes:

- a limiting portion, configured to cover the battery module; and
- two mounting portions, respectively connected to two sides of the limiting portion in the second direction, wherein the two mounting portions are respectively fixed to the fixed beams on the two sides of the battery module.

In some embodiments, the limiting portion as a whole protrudes toward the side away from the battery module relative to the mounting portions.

According to a second aspect of the present application, provided is a power consuming device, including a battery according to the foregoing embodiments, wherein the battery is configured to supply electric energy to the power consuming device.

In the battery according to the embodiments of the present application, by providing the weak area on the restraining component, part of the restraining component is more prone to deformation along with the expansion of the battery cell, and the ability of the restraining component to follow deformation can be improved, so that it is possible to not only prevent the expansion of the battery cell from affecting a restraining force of the restraining component on other battery cells, but also in the case where a bonding layer is provided, to reduce the degree of debonding of the bonding layer between the restraining component and the battery cell. Therefore, on the basis of not affecting the overall structural strength of the restraining component, the restraining force of the restraining component on the battery cell is ensured to prevent the failure of the battery, thereby improving the reliability and prolonging the service life of the battery in operation.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without any creative effort.

Figure 1:
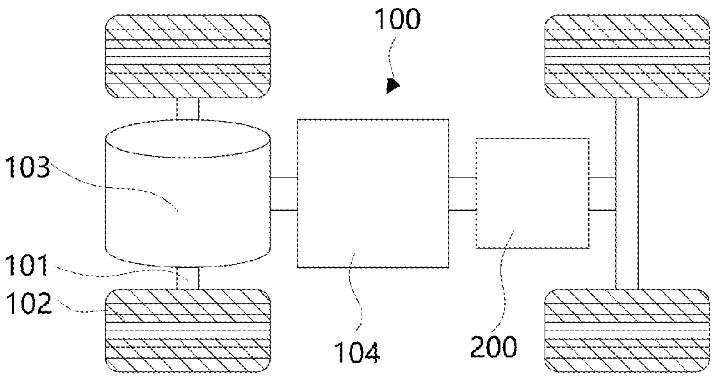
FIG. 1 is a schematic structural diagram of a battery mounted to a vehicle according to some embodiments of the present application.

In the accompanying drawings, the figures are not drawn to scale.

LIST OF REFERENCE NUMERALS

100. Vehicle; 101. Axle; 102. Wheel; 103. Motor; 104. Controller;
200. Battery; 211. Housing; 212. Electrode assembly; 213. Connecting portion; 214. Adapter; 215. End cap; 215A. End cap body; 215B. Positive terminal; 215C. Negative terminal; 215D. Explosion-proof valve;
1. Case assembly; 11. Case; 12. Fixed beam;
2. Battery module; 21. Battery cell;
3. Restraining component; 31. Limiting portion; 311. Weak area; 32. Mounting portion; 321. Mounting hole; 322. Positioning hole;
4. Outer cover;
5. Bonding layer; 51. Limiting boss;
6. Fastener;
X. First direction; Y. Second direction; and Z. Third direction.

DETAILED DESCRIPTION OF EMBODIMENTS

The following further describes in detail implementations of the present application with reference to the accompanying drawings and embodiments. The detailed description of the following embodiments and the drawings are used to illustrate the principle of the present application by way of example, but shall not be used to limit the scope of the present application. In other words, the present application is not limited to the described embodiments.

In the description of the present application, it should be noted that, unless otherwise specified, "a plurality of" means at least two. An orientation or a position relationship indicated by the terms "upper", "lower", "left", "right", "inner", "outer", etc. is merely for convenient and brief description of the present application, rather than indicating or implying that an indicated apparatus or element needs to have a particular orientation or be constructed and operated in a particular orientation, and therefore cannot be construed as limiting the present application. In addition, the terms "first", "second", "third", etc. are merely for the purpose of description, and shall not be construed as indicating or implying relative importance. "Perpendicular" is not necessarily perpendicular in the strict sense, and a range of errors is allowed. "Parallel" is not necessarily parallel in the strict sense, and a range of errors is allowed.

The orientation terms in the following description all indicate directions shown in the drawings, and do not impose a limitation on a specific structure in the present application. In the description of the present application, it should further be noted that, the term "mount", "engage", and "connect" should be interpreted in the broad sense unless explicitly defined and limited otherwise, which, for example, may mean a fixed connection, a detachable connection or an integral connection; or may mean a direct connection, or an indirect connection by means of an intermediary. For those of ordinary skill in the art, specific meanings of the foregoing terms in the present application may be understood in specific circumstances.

In order to clearly describe the various orientations in the following embodiments, the various directions are defined below. Taking a coordinate system of FIG. 4 as an example, a first direction X is located within a plane perpendicular to a height direction of a battery 200. For example, the first direction X represents a length direction of the battery 200. A second direction Y is also located within the plane perpendicular to the height direction of the battery 200, and is perpendicular to the first direction X. For example, the second direction Y represents a width direction of the battery 200. A third direction Z is perpendicular to the plane formed by the first direction X and the second direction Y. For example, the third direction Z represents the height direction of the battery 200.

Figure 4:
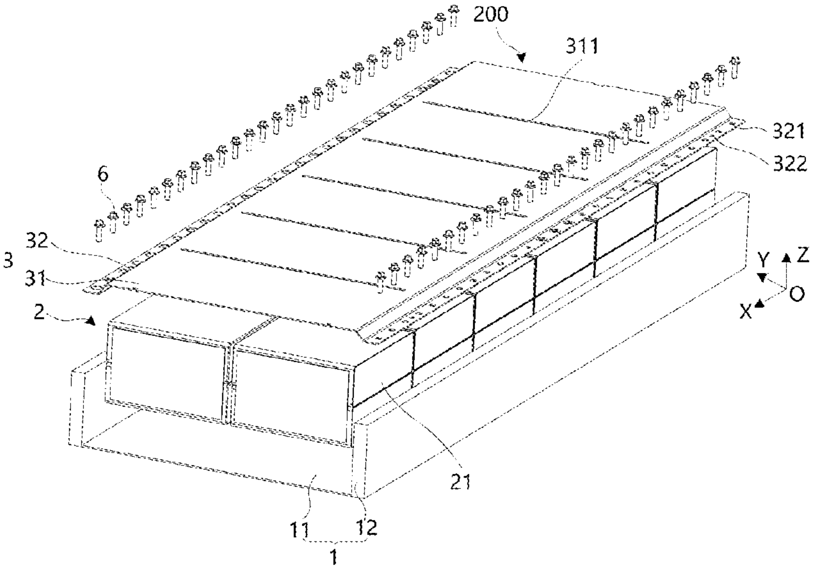
FIG. 4 is an exploded view of an internal structure of a battery according to some embodiments of the present application.

In embodiments other than that in FIG. 4, the first direction X may also represent the width direction of the battery 200, and the second direction may represent the length direction of the battery 200; or the first direction X represents any direction located within the plane perpendicular to the height direction of the battery 200.

On the basis of such orientation definitions, the description of the orientations or positional relationships indicated by the terms "upper", "lower", "top", "bottom", "front", "rear", "inner", "outer", etc. are merely for convenient description of the present application, rather than indicating or implying that a device referred to needs to have a particular orientation or be constructed and operated in a particular orientation, and therefore cannot be construed as limiting the scope of protection of the present application.

As part of the invention and innovation process of the present application, through numerous tests and verifications, the inventors have found that the reasons for the low reliability and short service life of the battery may be as follows.

For a battery in which a plurality of battery cells are placed flat in a case, an expansion surface of each battery cell is restrained by a bottom plate and a top plate of the case, and is less restrained and prone to expansion compared with a battery having battery cells placed vertically. When a core inside the battery cell expands to a certain extent (e.g., 16%), the top plate and the expansion surface of the battery cell have inconsistent degrees of deformation, resulting in serious debonding of bonding surfaces between the battery cell and the top plate weakening a restraining effect of the top plate on the battery cell, which may cause the battery cell to shake in the case, or cause deformation or failure of the structural member of the battery due to an excessive stress.

Moreover, if some of the battery cells have a larger degree of expansion, the top plate as a whole will be forced to arch and deform, the restraining effect on the other battery cells will be affected, and the top plate has a poor ability to deform along with the battery cells.

If the thickness of the top plate is reduced, although the ability of the top plate to follow the deformation of the battery cell can be improved and the degree of debonding can be reduced, the overall structural strength will be affected and it is difficult to meet the structural strength requirements of the battery.

Therefore, according to the present application, in order to improve the reliability and prolong the service life of the battery, it is not only necessary to ensure the overall structural strength of the battery, but also to reduce the degree of deformation of the top plate that restrains the battery cells, so as to improve the problem of debonding, thereby ensuring the restraining force on the battery cells.

A battery may be used in a power consuming device, and the battery is configured to supply electric energy to the power consuming device. The power consuming device may be, for example, a mobile phone, a portable apparatus, a laptop, an electric motorcycle, an electric vehicle, a ship, a spacecraft, an electric toy, or an electric tool. For example, the spacecraft includes an airplane, a rocket, a space shuttle, or a spaceship. The electric toy includes a fixed or mobile electric toy, such as a game console, an electric vehicle toy, an electric ship toy, and an electric airplane toy. The electric tool includes an electric tool for metal cutting, an electric tool for grinding, an electric tool for assembling and an electric tool for railways, such as an electric drill, an electric grinder, an electric wrench, an electric screwdriver, an electric hammer, an electric impact drill, a concrete vibrator, and an electric planer.

As shown in FIG. 1, the power consuming device may be a vehicle 100, for example, a new energy vehicle. The new energy vehicle may be a battery electric vehicle, a hybrid electric vehicle, an extended-range electric vehicle, or the like. Alternatively, the power consuming device may be an unmanned aerial vehicle, a ship, or the like. The vehicle 100 includes a battery 200. The battery 200 is configured to supply electric energy for the operation of the vehicle.

The vehicle 100 further includes axles 101, wheels 102 connected to the axles 101, a motor 103 and a controller 104. The motor 103 is configured to drive the axle 101 to rotate, the controller 104 is configured to control the operation of the motor 103, and the battery 200 is configured to supply electric energy for the operation of the motor 103 and other components in the vehicle.

Figure 2:
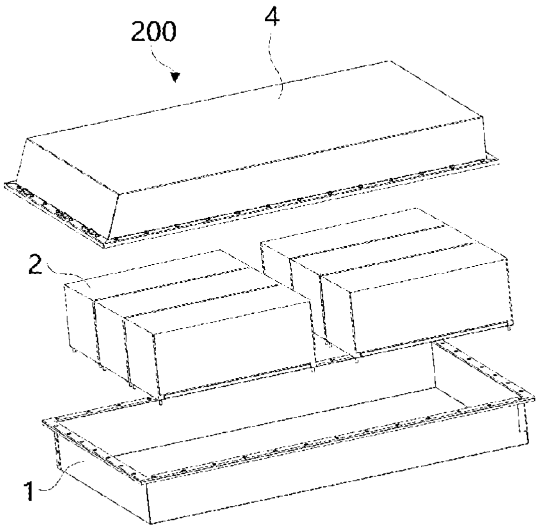
FIG. 2 is a schematic structural diagram of a battery according to some embodiments of the present application.

As shown in FIG. 2, the battery 200 may include a case assembly 1, a battery module 2 and an outer cover 4. The interior of the case assembly 1 is of a hollow structure, and the battery module 2 is received in the case assembly 1. The case assembly 1 is configured to provide a receiving space for the battery module 2. In some embodiments, the outer cover 4 and the case assembly 1 are covered by each other to define a receiving space for receiving the battery module 2. Of course, a connection between the case assembly 1 and the outer cover 4 may be sealed by a sealing member (not shown in the figures). The sealing member may be a sealing ring, a sealant or the like.

One or more battery cells 21 may be arranged in the battery module 2. If a plurality of battery cells 21 are provided, the plurality of battery cells 21 may be connected in series, in parallel or in a hybrid connection. The hybrid connection means that some of the plurality of battery cells 21 are connected in series and some are connected in parallel. The battery cell 21 may be a secondary battery in the shape of a cylinder, a square or in other shapes.

Figure 3:
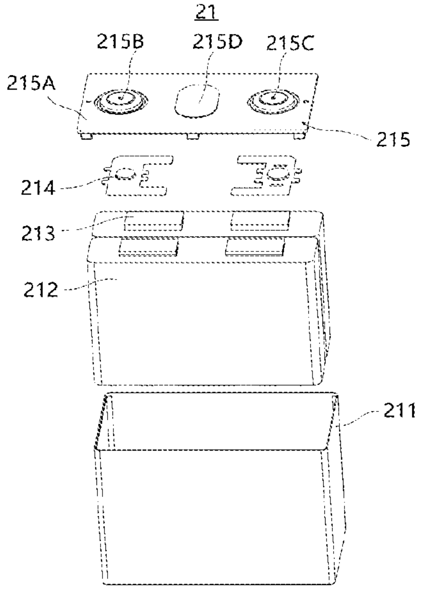
FIG. 3 is an exploded view of a battery cell in a battery according to some embodiments of the present application.

As shown in FIG. 3, the battery cell 21 may include a housing 211, an electrode assembly 212 and an end cap 215. The housing 211 has an opening, the electrode assembly 212 is received in the housing 211, and the end cap 215 is configured to close the opening of the housing 211. The end cap 215 includes an end cap body 215A, and a positive terminal 215B, a negative terminal 215C and an explosion-proof valve 215D which are arranged on the end cap body 215A. One or more electrode assemblies 212 may be arranged in a stacking manner. Each electrode assembly 212 is provided with two connecting portions 213, and the two connecting portions 213 are connected to the positive terminal 215B and the negative terminal 215C via adapters 214.

The electrode assembly 212 may include a positive electrode plate, a negative electrode plate (not shown in the figures) and a separator (not shown in the figures). The electrode assembly 212 may be of a winding structure formed by winding the positive electrode plate, the separator and the negative electrode plate, or a laminated structure formed by laminating the positive electrode plate, the separator film and the negative electrode plate. The electrode assembly 212 also includes a positive electrode tab and a negative electrode tab. A positive electrode current collector in the positive electrode plate that is not coated with a positive electrode active material layer may be used as the positive electrode tab, and a negative electrode current collector in the negative electrode plate that is not coated with a negative electrode active material layer may be used as the negative electrode tab.

In some embodiments, as shown in FIG. 4, the present application provides a battery 200, which includes a case assembly 1, a battery module 2, and a restraining component 3. The case assembly 1 includes a case 11 and fixed beams 12 fixed in the case 11. The battery module 2 is arranged in the case 11. The battery module 2 includes a plurality of battery cells 21 arranged in a first direction X. The restraining component 3 is configured to cover the battery module 2 and fixed to the fixed beams 12. The restraining component 3 is provided with a weak area 311, and the weak area 311 is configured to allow the restraining component 3 to be deformed when being subjected to an expansion force of each battery cell 21.

For example, the fixed beams 12 may be arranged in the first direction X. The first direction X may be for example a length direction or a width direction of the battery 200. A plurality of fixed beams 12 may be arranged at intervals in the second direction Y, and the restraining component 3 is fixed by means of two adjacent fixed beams 12. The fixed beams 12 each may be a solid fixed beam or a hollow fixed beam, its cross section may be rectangular, trapezoidal or C-shaped, etc., and its upper surface may be provided as a flat surface, so that the restraining component 3 is fixed to upper surfaces of the fixed beams 12, or the restraining component 3 may be fixed to side surfaces of the fixed beams 12.

For example, the plurality of battery cells 21 may be arranged in one or more layers, and each layer of battery cells 21 includes one column or multiple columns of battery cells 21 arranged side-by-side in the second direction Y, and each column of battery cells 21 includes a plurality of battery cells 21 which are arranged side-by-side in the first direction X. The positive electrode plate and the negative electrode plate in the battery cell 21 are stacked in the third direction Z, and accordingly the battery cell 21 is prone to expansion in the third direction Z.

The restraining component 3 is configured to cover the battery module 2. The term "cover" mentioned here may refer to "fully cover" or "partially cover", that is, a structural feature such as a hole and a slot that expose the battery cells 21 is allowed to be provided on the restraining component 3, as long as the restraining force can be provided to restrain the expansion of each battery cell 21 of the battery module 2 in the third direction Z. In order to improve the restraining effect, a bonding layer 5 is provided between the restraining component 3 and the battery module 2. For example, glue or another adhesive material is used for bonding.

According to the embodiments of the present application, with the arrangement of the restraining component 3 fixed to the fixed beams 12, when a battery cell 21 expands, a stable and effective pressing force can be provided to the battery cell 21 to reduce the degree of expansion deformation of the battery cell 21.

Furthermore, by providing the weak area 311 on the restraining component 3, part of the restraining component 3 is more prone to deformation along with the expansion of the battery cell 21, and the ability of the restraining component 3 to follow deformation can be improved, so that it is possible to not only prevent the expansion of the battery cell 21 from affecting a restraining force of the restraining component 3 on other battery cells 21, but also in the case where a bonding layer 5 is provided, to reduce the degree of debonding of the bonding layer 5 between the restraining component 3 and the battery cell 21. Therefore, according to the embodiments, on the basis of not affecting the overall structural strength of the restraining component 3, the restraining force of the restraining component 3 on the battery cell 21 is ensured to prevent the failure of the battery 200, thereby improving the reliability and prolonging the service life of the battery 200 in operation.

In some embodiments, as shown in FIG. 4, the weak area 311 is arranged at least in an adjoining region between the battery cells 21 adjacent to each other in the first direction X.

In the embodiments, the weak area 311 is provided at side edges of the battery cells 21, so that it is possible to ensure the restraining force of the restraining component 3 on the battery cells 21 as much as possible, and also to separate the battery cells 21 adjacent to each other in the first direction X, thereby weakening the transmission of acting force of the restraining component 3 between the adjacent battery cells 21, improving the ability of the restraining component 3 to follow deformation, and preventing the adjacent battery cells 21 from interfering with each other during expansion. Moreover, in the case where a bonding layer 5 is provided, the degree of debonding of the bonding layer 5 between the restraining component 3 and the battery cells 21 can also be reduced. Therefore, the restraining force of the restraining component 3 on the battery cells 21 is ensured, thereby improving the reliability and prolonging the service life of the battery 200 in operation.

Figure 5:
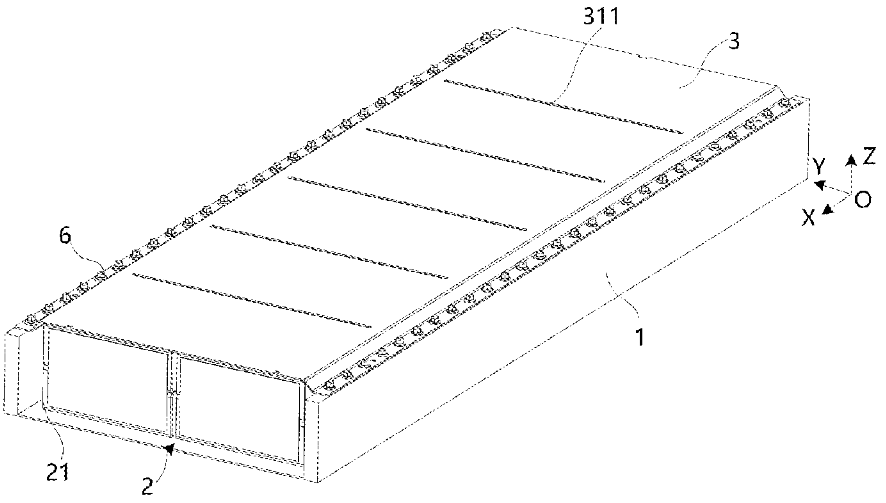
FIG. 5 is a schematic diagram of an internal structure of a battery according to some embodiments of the present application.

In some embodiments, as shown in FIG. 5, the weak area 311 includes a slot extending in a second direction Y. The slot may be configured as a groove or a through-slot, and the second direction Y is perpendicular to the first direction X. For example, the slot may be an elongated slot, so that a local strength can be reduced while ensuring the overall strength of the restraining component 3.

For example, a size range of the slot extending in the second direction Y may be between 2 mm and 20 mm, and the size range is related to the size of the battery cell 21. Generally, in the second direction Y, the size range of the slot is set to be twice the size of the battery cell 21±40 mm.

According to the embodiments, it is easy to provide the weak area 311, which may be formed by stamping or machining. For the structure in which the slot is provided in the adjoining region between the adjacent battery cells 21, the coverage area of the restraining component 3 on expansion surfaces of the battery cells 21 can be expanded while preventing the adjacent battery cells 21 from interfering with each other during expansion, so as to increase the restraining force on the battery cells 21.

Figure 6:
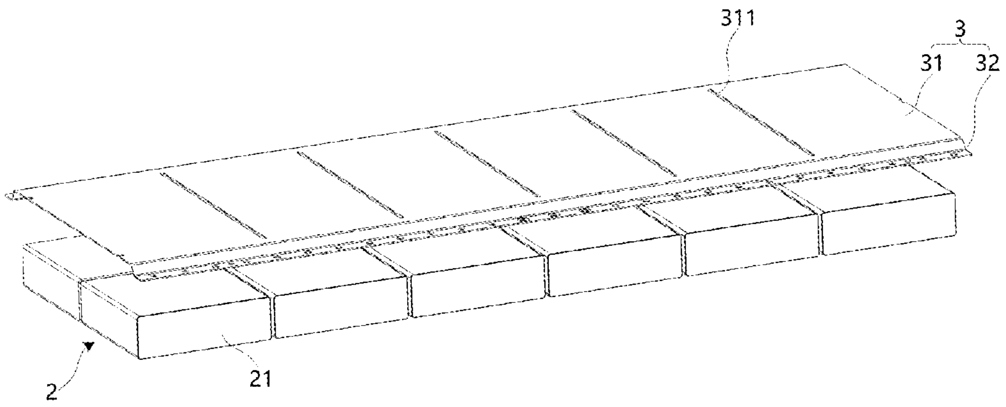
FIG. 6 is a schematic diagram showing a mounting relationship of a restraining component and a battery module of a battery according to some embodiments of the present application.

In some embodiments, as shown in FIGS. 5 and 6, the weak area 311 is continuously arranged in a second direction Y. The second direction Y being perpendicular to the first direction X.

According to the embodiments, it is possible for the restraining component 3 to be deformed more easily along with the expansion of the battery cells 21 in the region where the weak area 311 is provided, so that the ability of the restraining component 3 to follow deformation can be improved, the expansion of a battery cell 21 can be prevented from effecting the restraining force on the adjacent battery cells 21, and the degree of debonding of the bonding layer 5 between the restraining component 3 and the battery cell 21 can be reduced, thereby improving the reliability and prolonging the service life of the battery 200 in operation. Optionally, a plurality of sections of the weak area 311 are arranged apart from each other in the second direction Y.

In some embodiments, the weak area 311 penetrates the restraining component 3 in a third direction Z. The third direction Z is perpendicular to a plane formed by the first direction X and a second direction Y, and the second direction Y is perpendicular to the first direction X.

According to the embodiments, the arrangement of the weak area 311 penetrating the restraining component 3 facilitates weakening the local strength of the restraining component 3, so that it is easier for the restraining component 3 to be deformed along with the expansion of the battery cells 21, the ability of the restraining component 3 to follow deformation can be further improved, the expansion of a battery cell 21 can be prevented from effecting the restraining force on the adjacent battery cells 21, and the degree of debonding of the bonding layer 5 between the restraining component 3 and the battery cell 21 can be reduced, thereby improving the reliability and prolonging the service life of the battery 200 in operation. Optionally, the weak area 311 may also be a portion with a reduced thickness, or the weak area 311 has a material strength smaller than that of other regions of the restraining component 3 except the weak area 311.

In some embodiments, the battery 200 further includes an outer cover 4 arranged on the side of the restraining component 3 away from the case 11, and configured to close an opening end of the case 11. A preset gap L is provided between an inner surface of the outer cover 4 and an outer surface of the restraining component 3.

In the embodiments, with the arrangement of the restraining component 3, deformation of the outer cover 4 can be reduced, and the sealing performance of the battery can be improved. Moreover, since the deformation of the outer cover 4 is reduced with the arrangement of the restraining component 3, when the battery 200 is used in a vehicle, the battery can still be smoothly disassembled at the original installation position after long-term use, which can reduce the maintenance difficulty of the battery 200, and can also prevent the application of an external force to a mounting structure on the vehicle due to deformation of the battery 200.

Figure 10:
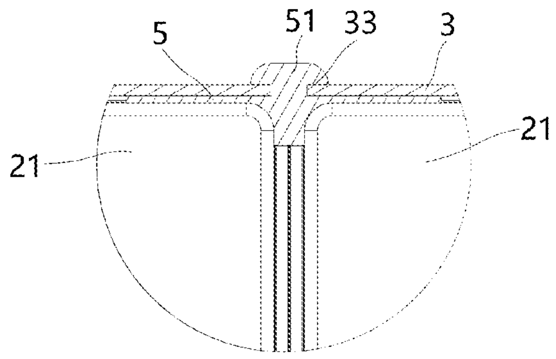
FIG. 10 is a schematic structural diagram of a limiting boss of a bonding layer formed by overflowing from the position of a weak area in a battery of the present application.

In some embodiments, as shown in FIG. 10, a bonding layer 5 is provided between the restraining component 3 and at least part of the battery cells 21, the weak area 311 penetrates the restraining component 3 in the third direction Z, and the bonding layer 5 overflows through the weak area 311 and forms a limiting boss 51 on the surface of the restraining component 3 away from the battery cells 21. For example, the battery module 2 includes a plurality of layers of battery cells 21, a bonding layer 5 is provided between the restraining component 3 and the topmost layer of battery cells 21, and a bonding layer 5 may also be provided between adjacent layers of battery cells 21 or between the bottommost layer of battery cells 21 and the case 11.

According to the embodiments, while improving the ability of the restraining component 3 to follow deformation, a coating process of the bonding layer 5 is used to control an adhesive such as glue to overflow to the surface of the restraining component 3 away from the battery cells 21, so as to form a "rivet" structure. Due to a limiting effect of the limiting boss 51, the amount of arching of the restraining component 3 between the adjacent battery cells 21 can be reduced, thereby effectively reducing the debonding risk of the bonding layer 5, improving the structural strength of the battery 200, and ensuring the reliability and safety of the battery 200 in operation.

For the embodiments in which the weak area 311 is provided in an adjoining region between the battery cells 21 adjacent to each other in the first direction X, since the adjoining region between two battery cells 21 is most likely to be subjected to debonding, the arrangement of the limiting boss 51 can improve the problem of debonding of the bonding layer 5 caused by the expansion of the battery cells 21, thereby improving the structural stability. Moreover, the side edge of the battery cell 21 is at a position with the smallest degree of expansion, and the overflow of the bonding layer 5 formed there will not occupy the expansion space of the battery cell 21, nor affect the expansion gap of the battery cell 21, thereby avoiding effecting the energy density of the battery 200.

Moreover, the preset gap L provided between an inner surface of the outer cover 4 and an outer surface of the restraining component 3 not only leaves a space for forming the limiting boss 51, but also leaves a space for proper expansion of the battery cells 21.

Figure 7:
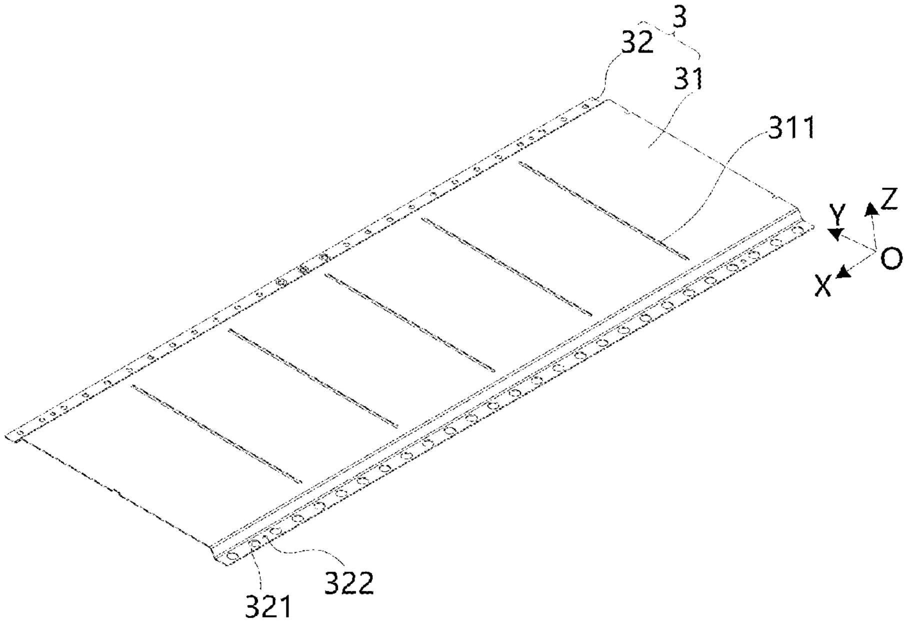
FIGS. 7, 8, and 9 are respectively a perspective view, a top view, and a side view of a restraining component of a battery according to some embodiments of the present application.
Figure 8:
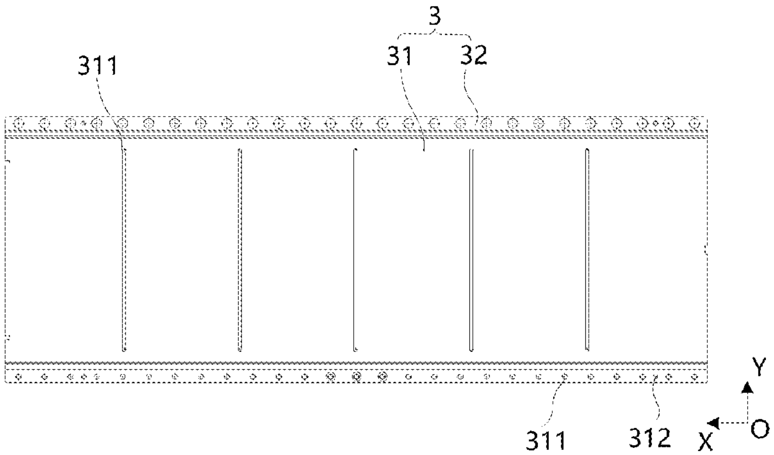
Figure 9:
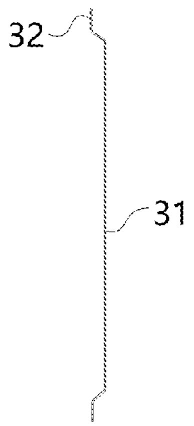

In some embodiments, as shown in FIG. 4, the fixed beams 12 are arranged on two sides of the battery module 2 in a second direction Y. The second direction Y is perpendicular to the first direction X. As shown in FIGS. 7 to 9, the restraining component 3 includes: a limiting portion 31, configured to cover the battery module 2; and two mounting portions 32, respectively connected to two sides of the limiting portion 31 in the second direction Y. The two mounting portions 32 are respectively fixed to the fixed beams 12 on the two sides of the battery module 2. For example, the restraining component 3 may be formed by a sheet metal stamping process.

Each of the two mounting portions 32 is provided with a plurality of mounting holes 321 at intervals in an extending direction of the corresponding fixed beam 12. Each fixed beam 12 is provided with a plurality of second mounting holes at intervals in its own extending direction. A plurality of fasteners 6 respectively pass through the corresponding mounting holes 321 and the second mounting holes to mount the restraining component 3 to the fixed beams 12. For example, the fasteners 6 may be screws, bolts, rivets or the like. In order to improve the positioning accuracy of the restraining component 3, the mounting portions 32 may be provided with positioning holes 322, so that the restraining component is positioned with pins before being fixed with the fasteners 6.

In the battery 200 according to the embodiments, the restraining component 3 is fixed to the fixed beams 12 on two sides; and when the battery module 2 expands, a stable and effective pressing force can be provided to each battery module 2 to reduce the degree of expansion deformation of the battery module 2.

As shown in FIGS. 7 to 9, the limiting portion 31 as a whole protrudes toward the side away from the battery module 2 relative to the mounting portions 32.

According to the embodiments, the height of each fixed beam 12 can be reduced to ensure the strength of the fixed beam 12. Moreover, when the mounting portion 32 is fixed to the corresponding fixed beam 12 via the fasteners 6, the fasteners 6 can be prevented from protruding from a top surface of the limiting portion 31, so that the height of the battery 200 can be reduced. Furthermore, the overall rigidity of the restraining component 3 can be improved.

A specific embodiment of the battery 200 of the present application is given below with reference to FIGS. 4 to 10.

A plurality of fixed beams 12 are arranged in the case 1 in the second direction Y. The battery module 2 is arranged between adjacent fixed beams 12. The restraining component 3 is configured to cover the battery module 2 and is fixed to the fixed beams 12 on two sides. The battery module 2 includes at least two columns of battery cells 21 arranged side-by-side in the second direction Y. Each column of battery cells 21 includes at least two layers of battery cells 21, and each layer of battery cells 21 includes a plurality of battery cells 21 arranged side-by-side in the first direction X. The battery cells 21 in the at least two columns of battery cells 21 are aligned in the first direction X. Each battery cell 21 is placed flat in the case 11. The positive electrode plate and the negative electrode plate are stacked with each other in the electrode assembly 212 in the third direction Z, and the electrode assembly 212 expands mainly in the third direction Z. The largest side surface of the battery cell 21 is arranged perpendicular to the third direction Z.

The restraining component 3 is provided with a plurality of weak areas 311 extending in the second direction Y at intervals in the first direction X. Each weak area 311 is provided at the adjoining position between the battery cells 21 adjacent to each other in the first direction X, and the weak area 311 is a slot penetrating the restraining component 3 in the third direction Z. The slot may extend in a straight line and pass through at least two columns of battery cells 21. A bonding layer 5 is provided between the restraining component 3 and a top layer of battery cells 21, and the bonding layer 5 overflows through the weak area 311 and forms a limiting boss 51 on the surface of the restraining component 3 away from the battery cells 21. Optionally, the weak area 311 may also extend in the first direction X, for example, it may be provided in a region between two adjacent columns of battery cells 21 to prevent the two columns of battery cells 21 from interfering with each other during expansion.

Although the present application is described with reference to the preferred embodiments, various improvements may be made thereto, and the components thereof may be replaced with equivalents, without departing from the scope of the present application. In particular, the technical features mentioned in the embodiments can be combined in any manner as long as there is no structural conflict. The present application is not limited to specific embodiments disclosed herein, but includes all technical solutions that fall within the scope of the claims.

The invention claimed is:

1. A battery, comprising:

a case assembly, comprising a case and fixed beams fixed in the case;

a battery module arranged in the case, wherein the battery module comprises a plurality of battery cells arranged in a first direction (X); and a restraining component, configured to cover the battery module and fixed to the fixed beams, wherein the restraining component is provided with a weak area, and the weak area is configured to allow the restraining component to be deformed when being subjected to an expansion force of each battery cell, the weak area comprises a slot extending in a second direction (Y) and is arranged at least in an adjoining region between two adjacent battery cells of the plurality of battery cells in the first direction (X), the second direction (Y) is perpendicular to the first direction (X), the weak area penetrates the restraining component in a third direction (Z), the third direction (Z) being perpendicular to a plane formed by the first direction (X) and the second direction (Y).

2. The battery according to claim 1, wherein the weak area has a material strength smaller than that of other regions of the restraining component.

3. The battery according to claim 1, wherein the weak area is continuously arranged in the second direction (Y).

4. The battery according to claim 1, wherein a plurality of sections of the weak area are arranged apart from each other in the second direction (Y).

5. The battery according to claim 1, further comprising:

an outer cover, arranged on a side of the restraining component away from the case, and configured to close an opening end of the case.

6. The battery according to claim 5, wherein a preset gap (L) is provided between an inner surface of the outer cover and an outer surface of the restraining component.

7. The battery according to claim 1, wherein a bonding layer is provided between the restraining component and at least part of the plurality of battery cells, the bonding layer overflows through the weak area and forms a limiting boss on an outer surface of the restraining component away from the battery cells.

8. The battery according to claim 7, wherein the limiting boss forms a rivet structure between the two adjacent battery cells of the plurality of battery cells in the first direction (X).

9. The battery according to claim 1, wherein the fixed beams are arranged on two sides of the battery module in the second direction (Y); and wherein the restraining component comprises:

a limiting portion, configured to cover the battery module; and two mounting portions, respectively connected to two sides of the limiting portion in the second direction (Y), wherein the two mounting portions are respectively fixed to the fixed beams on the two sides of the battery module.

10. The battery according to claim 9, wherein the limiting portion as a whole protrudes toward the side away from the battery module relative to the mounting portions.

11. A power consuming device, comprising a battery according to claim 1, wherein the battery is configured to supply electric energy to the power consuming device.

12. The battery according to claim 9, wherein each of the two mounting portions is provided with a plurality of mounting holes at intervals in an extending direction of the corresponding fixed beam;

each fixed beam is provided with a plurality of second mounting holes at intervals in its own extending direction; and a plurality of fasteners respectively pass through the corresponding mounting holes and the second mounting holes to mount the restraining component to the fixed beams.

13. The battery according to claim 1, wherein the plurality of battery cells comprises at least two adjacent columns of battery cells, the two adjacent columns are arranged side-by-side along the second direction (Y), the weak area comprises a slot extending in the first direction (X) and arranged in a region between the two adjacent columns of battery cells.

14. The battery according to claim 13, wherein each one of the two adjacent columns of battery cells comprises at least two layers of battery cells, the at least two layers are arranged in the third direction (Z), each one of the at least two layers comprises at least two battery cells of the plurality of battery cells, a bonding layer is provided between two adjacent layers of the at least two layers of battery cells.

15. The battery according to claim 12, wherein the two mounting portions are provided with a plurality of positioning holes for the restraining component to be positioned with the fixed beams before being fixed with the plurality of fasteners.

* * * * *